United States Patent [19]

Dussartre

[11] 4,030,367
[45] June 21, 1977

[54] DEVICE FOR CORRECTING THE LAW OF DEFLECTION OF AN ANEROID CAPSULE

[75] Inventor: Roger Dussartre, Versailles, France
[73] Assignee: Jaeger, Levallois-Perret, France
[22] Filed: Mar. 19, 1976
[21] Appl. No.: 668,397
[30] Foreign Application Priority Data
  Apr. 24, 1975 France .............................. 75.12866
[52] U.S. Cl. .................................... 73/410; 73/393
[51] Int. Cl.² ......................................... G01L 7/06
[58] Field of Search ............ 73/410, 386, 387, 406, 73/398 AR, 393

[56] References Cited
UNITED STATES PATENTS

| | | | |
|---|---|---|---|
| 2,079,069 | 5/1937 | Johnson | 73/410 |
| 3,238,487 | 3/1966 | Le Van et al. | 73/398 AR |
| 3,315,534 | 4/1967 | Whippo | 73/410 |

*Primary Examiner*—Donald O. Woodiel

[57] ABSTRACT

A device for correcting the law of deflection of an aneroid capsule comprising two or more strips of different rigidity, whereof the active ends are placed in abutment at various points of a path covered by the central part of an active diaphragm of the aneroid capsule during its deflection, associated with which or each of which is/are one or more abutments of adjustable length located in the path of deformation of the associated strip, in order to modify the active length of said strip depending on the law of deformation of the latter which it is desired to obtain.

1 Claim, 3 Drawing Figures

DEVICE FOR CORRECTING THE LAW OF DEFLECTION OF AN ANEROID CAPSULE

The device according to the invention relates to aneroid capsules which are sensitive to differential pressure and used in instruments for measuring speed and pressure, in particular on board aircraft and more particularly a device for correcting the law of deflection of the said capsules.

Generally, the law of deflection of the capsule, which it is desired to obtain, is in the form illustrated in FIG. 1 and the object of the device to which the present invention relates is to facilitate the most accurate approximation of this curve.

To do this, one uses a system composed of two or more flexible strips of different rigidity, whereof the active end is placed in abutment at various points of the path covered by the central part of the active diaphragm of the aneroid capsule during its deflection. Associated with each of these strips is one or more abutments of adjustable length located on the path of deformation of the associated strip. The length and position of said abutments is calculated to obtain modifications of the active length of each of the strips, capable of providing the deformation curve of the latter, which it is desired to obtain, in order that the combination of these curves gives the desired law of deflection for the capsule.

The accompanying figures illustrate an embodiment according to the invention, in which an assembly of two flexible strips is used:

Figure 1:
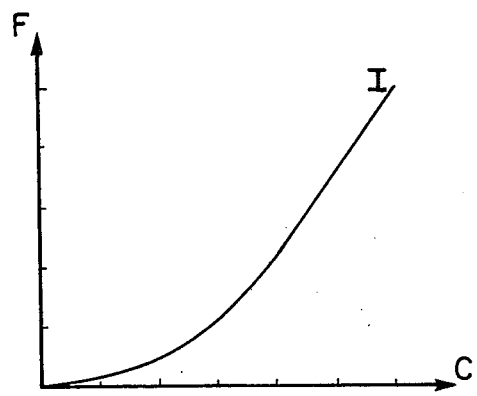
FIG. 1 shows the deflection law to be obtained.

The aneroid capsule is composed of two diaphragms: a diaphragm 1, fixed to a post 2, by appropriate means 3 and an active diaphragm 4 connected by a cotter pin 5 to a connecting rod/ crank system 6, which is intended to produce a rotation of predetermined law, depending on the displacement of the capsule. Two flexible strips 7 and 8 are fixed at one of their ends to a wall 9 integral with the frame of the apparatus, by means of screws 10 and 11. the rigidity of the strip 7 is greater than that of the strip 8 and the ends 12 and 13 of the two strips are bent over and directed towards the cotter pin 5 fixed to the centre of the diaphragm 4, so that they come into abutment with said cotter pin at a given instant of the travel of the diaphragm 4, during its deformation. An abutment 14 is mounted in a wall 15 integral with the frame of the apparatus in order to be located in the path covered by the strip 7, when the latter moves under the driving action of the diaphragm 4, after its end 12 has come into contact with the cotter pin 3. The length of the abutment 14 and consequently the position of the point of contact with the strip 7 is adjustable. Interposed in the bending path of the strip 8 in the same way are three abutments 16, 17 and 18, whereof the length and position in the wall 19 integral with the frame of the apparatus are dependent on modifications of the active length of the strip 8, which are necessary to obtain the desired deformation curve.

In fact, when the aneroid capsule expands, the active diaphragm 4 moves and the cotter pin 5 comes into contact with the active end of one of the flexible strips 7 and 8 at a given time dependent upon the position allotted to the cotter pin. This strip resists the movement of the diaphragm 4 by an opposing force which depends on its inherent rigidity and its active length which, as seen above, is modified at various points by adjustable abutments, the number and position of these points on the deformation curve depending on the number, position and length of said abutments.

Figure 2:
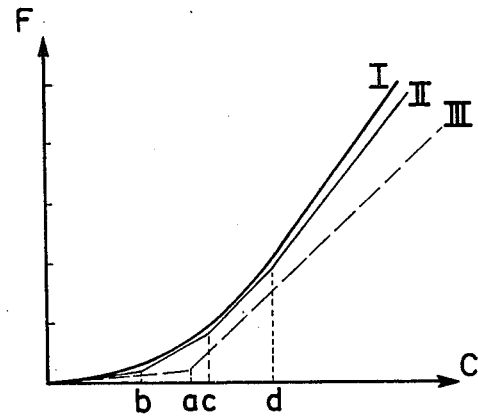
FIG. 2 shows a curve obtained by means of corrections applied by the flexible strip.
Figure 3:
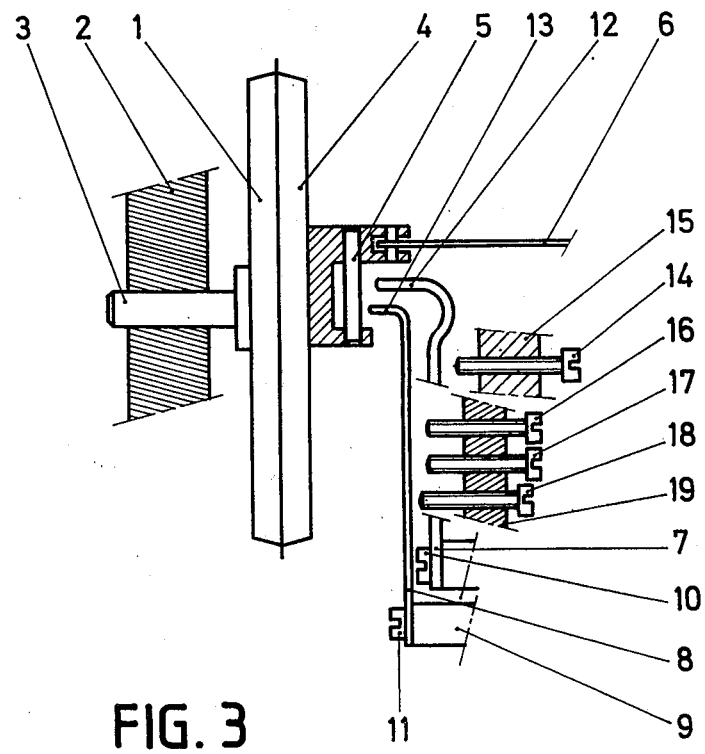
FIG. 3 is a view of the device used.

FIG. 2 illustrates this action. The latter shows that the desired deflection curve I for the aneroid capsule is obtained by the combination of the deformation curve of the strip 7 (curve II) which provides a rough approximation and of the strip 8 (curve III) which provides the fine adjustment.

The inflection points $a$, $b$, $c$ and $d$ of these two curves correspond to the action of the abutments.

Furthermore, the strips 7 and 8 are made from a material having an appropriate thermo-elastic coefficient, in order to compensate for the variations in the law resulting from temperature variations.

What is claimed is:

1. A device for correcting the law of deflection of an aneroid capsule sensitive to differential pressure, the device comprising an active diaphragm and at least two flexible strips of different rigidity, each having an end attached to a fixed frame of the device and a free end, the free ends of the strips being located at various points of a path covered by the central part of the active diaphragm of the aneroid capsule during its deflection, so that each free end constitutes an abutment for said central part when the central part reaches said free end, and wherein there is provided for at least one of said strips, abutments of adjustable length mounted on the fixed frame and located at various points in the region of displacement of said latter strips.

* * * * *